United States Patent

Staff

[15] 3,646,438
[45] Feb. 29, 1972

[54] APPARATUS FOR TESTING DIFFERENT KINDS OF ELECTROMECHANICAL COMPONENTS USING PREPROGRAMMED CONNECTING FOR EACH OF THE DIFFERENT COMPONENTS

[72] Inventor: Richard S. Staff, Livonia, Mich.
[73] Assignee: Essex International, Inc., Fort Wayne, Ind.
[22] Filed: May 19, 1969
[21] Appl. No.: 825,720

[52] U.S. Cl. ..................324/73 R, 324/28 R, 324/28 CB, 324/51
[51] Int. Cl. ..................................................G01r 15/12
[58] Field of Search........................324/22, 23, 51, 73, 28

[56] References Cited

UNITED STATES PATENTS

| | | | |
|---|---|---|---|
| 2,823,304 | 2/1958 | Shiels | 324/22 |
| 2,887,622 | 5/1959 | Rayburn et al. | 324/51 |
| 2,962,659 | 11/1960 | Neill | 324/73 |
| 3,305,772 | 2/1967 | Earnhart | 324/51 |
| 3,428,888 | 2/1969 | Nolte | 324/73 |

*Primary Examiner*—Rudolph V. Rolinec
*Assistant Examiner*—R. J. Corcoran
*Attorney*—Learman & McCulloch

[57] ABSTRACT

Indicating test apparatus for testing any one of a selected number of electrical components and comprising an indicating test unit having a plurality of electrically operable indicator means to provide an indication of proper circuit operation. The indicator means are adapted for connection with the selected component by means of interchangeable programmed connector means including a disconnect peculiar to the component being tested and a connector for removably connecting the disconnect means with the indicator means. Interchangeable overlays corresponding to the interchangeable programmed connectors and having indicia thereon peculiar to the selected component may be provided. Means may also be provided to vary the test unit's output voltage which is measured by a voltmeter.

3 Claims, 6 Drawing Figures

INVENTOR.
RICHARD S. STAFF

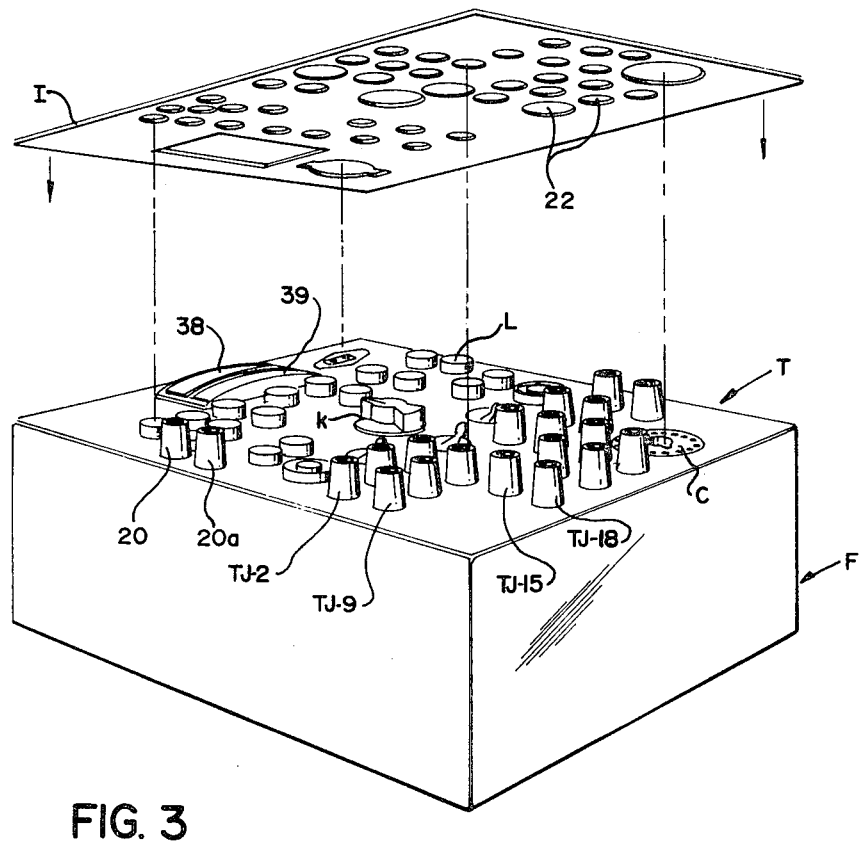
FIG. 3
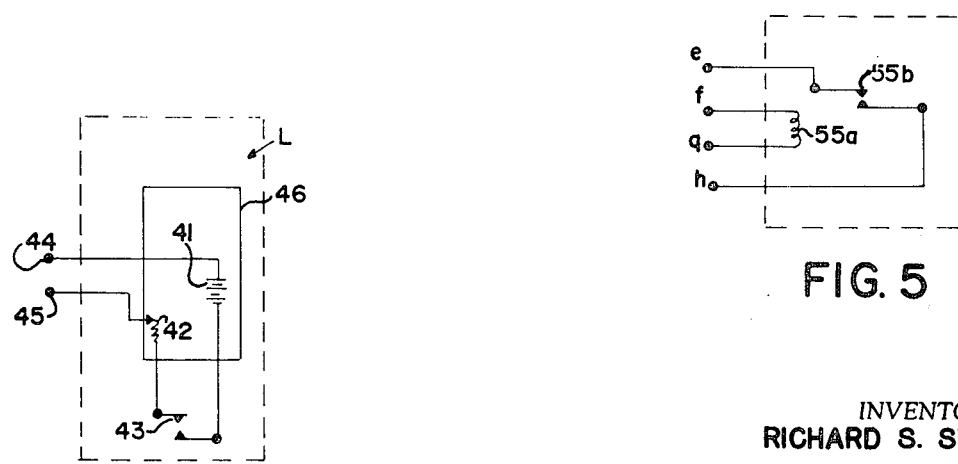
FIG. 6
FIG. 5
INVENTOR.
RICHARD S. STAFF

INVENTOR.
RICHARD S. STAFF

APPARATUS FOR TESTING DIFFERENT KINDS OF ELECTROMECHANICAL COMPONENTS USING PREPROGRAMMED CONNECTING FOR EACH OF THE DIFFERENT COMPONENTS

This invention relates to apparatus for testing electromechanical components, and more particularly to an indicating test unit for testing the continuity of circuits employed in electrical switches, motors, relays, and other similar devices. There exists a need in the manufacture of switch components and the like for an effective and efficient means of testing the product produced whereby a large array of test apparatus is not required to test the various components and the various lines of products produced, and yet will enable surveillance personnel to test rapidly the individual components.

Such test units provide valuable aids to permit testing of the operation of the electrical components as they are being produced in the manufacturer's plant prior to distribution to the customer.

Electrical components of the type mentioned are commonly employed in a vehicle to connect the vehicle's battery with the headlamps, turn signals, starter, windshield wiper and washer mechanism and other devices. When a circuit employing such a component is inoperative, much time often is lost in isolating the fault. In evaluating the operation of a circuit employing such a component, the component itself should first be tested. This can be accomplished by isolating the component from the remainder of the vehicle's electrical system and connecting it with a source of power to indicate circuit continuity. To facilitate the testing, it is desirable that such tests be made with the component remaining installed in the vehicle.

An object of this invention is to provide a single indicating test unit capable of testing a large number of electrical components either on or off a vehicle, preferably through the use of interchangeable connectors and readout interpreters.

Another object of the invention is to provide testing apparatus operable by nonelectrically oriented personnel, and one that is operable either on an alternating current source or from the vehicle battery.

Briefly, the present invention provides an apparatus for testing components by means of an indicating test unit having a plurality of electrically operable indicator means. Programmed connector means removable from the test unit is provided and includes disconnect means peculiar to the selected component and a connector for connecting selected ones of said indicator means which are adapted to be connected with a source of electrical power. An overlay data sheet corresponding to the programmed connector and having graphic material printed thereon may be removably mounted adjacent the indicator means to assist the operator in interpreting the operation of the indicator means which may suitably comprise a plurality of lamps.

Other objects and advantages of the invention will be pointed out specifically or will become apparent from the following description when it is considered in conjunction with the appended claims and the accompanying drawings, in which:

FIG. 3 is a perspective view of the indicating test unit and an overlay data sheet in a removed position;

FIG. 5 is an electrical schematic of a relay unit to be tested; and

FIG. 6 is an electrical schematic of an accessory component for use in testing circuit breakers.

Figure 1:
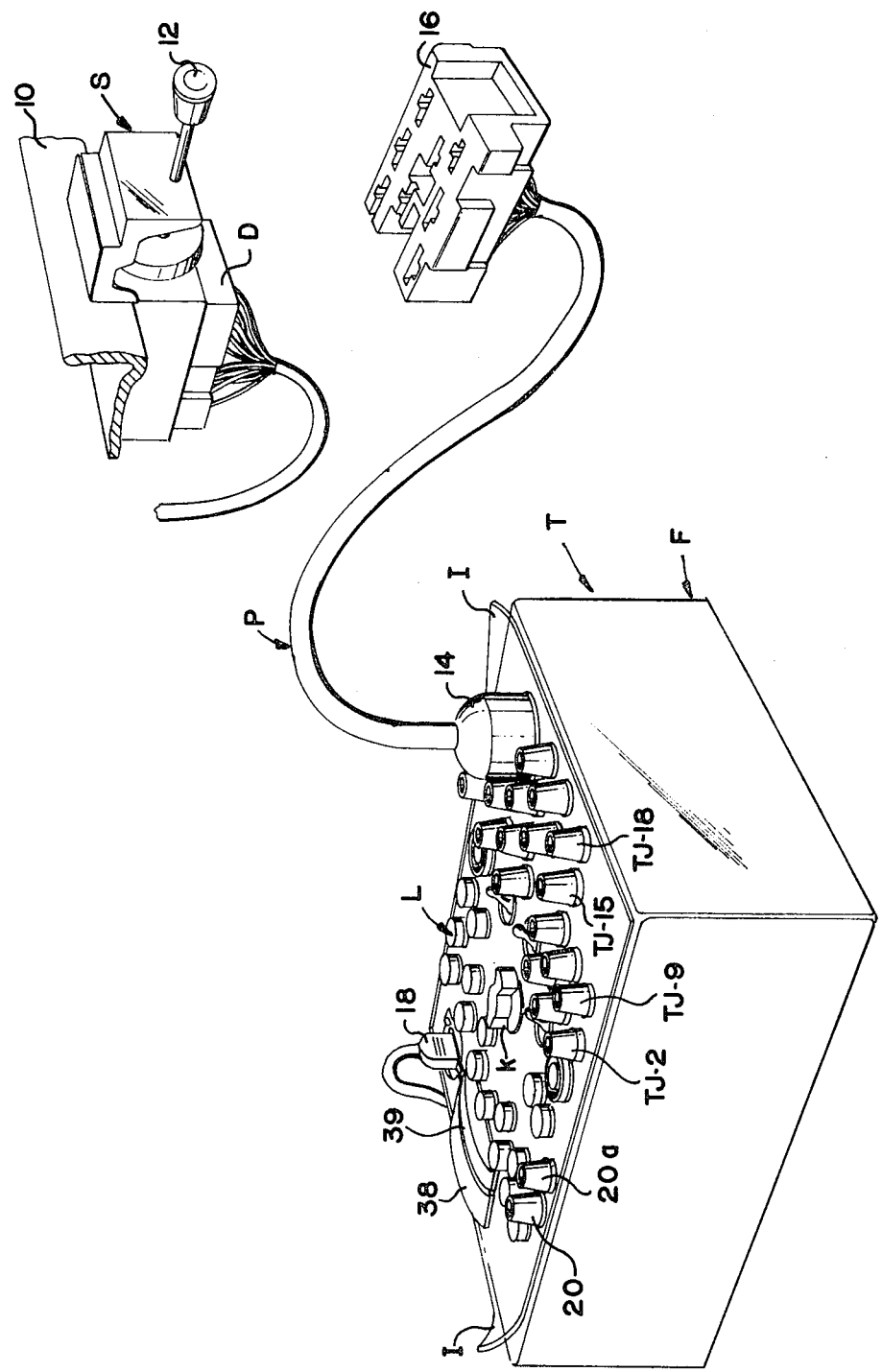
FIG. 1 is a perspective view illustrating a typical overlay in place on the indicating test unit which is positioned adjacent a vehicle-mounted switch unit to be tested.

An indicating test unit constructed in accordance with the invention is designated generally by the reference character T and is adapted to be coupled to a typical switch S to be tested by means of a programmed connector generally designated P. The switch S is shown mounted in position of the dashboard 10 of an automobile and includes a knob 12 for operating the switch which, for example, may comprise a multiposition switch for connecting the vehicle battery with the headlamps, parking lamps, instrument panel, dome light, and taillights. Switches, such as the switch S, normally are connected in circuit with the remainder of the vehicle's electrical system by an element which is referred to in the art as a "disconnect" D which is a receptacle in the vehicle which provides for the electrical entry or removal of the switch into or out of the vehicle electrical system, respectively. To prepare the switch for test operation, the disconnect D associated with the switch S is removed to enable the programmed connector P to be connected thereto.

The programmed connector P comprises an electrical harness with a multipin connector 14 at one end of the harness and a disconnect 16 for the switch S at the other end of the harness. The disconnect 16 is substantially identical to the disconnect D normally associated with the switch S and which connects the latter to the vehicle's electrical circuit. The connecting contacts in the disconnect 16 are similar to those of the vehicle's disconnect D which is uncoupled from the switch S prior to use of the test unit T. The disconnect 16, therefore, is particularly adapted for use with the particular switch S shown and is therefore peculiar to the component being tested. A special programmed connector P is thus formed for each component to be tested with a separate disconnect which is peculiar to that particular component. Thus, there is no special knowledge required on the part of the operator for determining which pins of the connector 14 should be connected with the contacts of the switch S. With the proper electrical relationship established between the disconnect 16 and the connector 14, the programmed connector P represents permanently prewired circuitry which is selectively interchangeable to correspond with the particular switch being tested.

Figure 2:
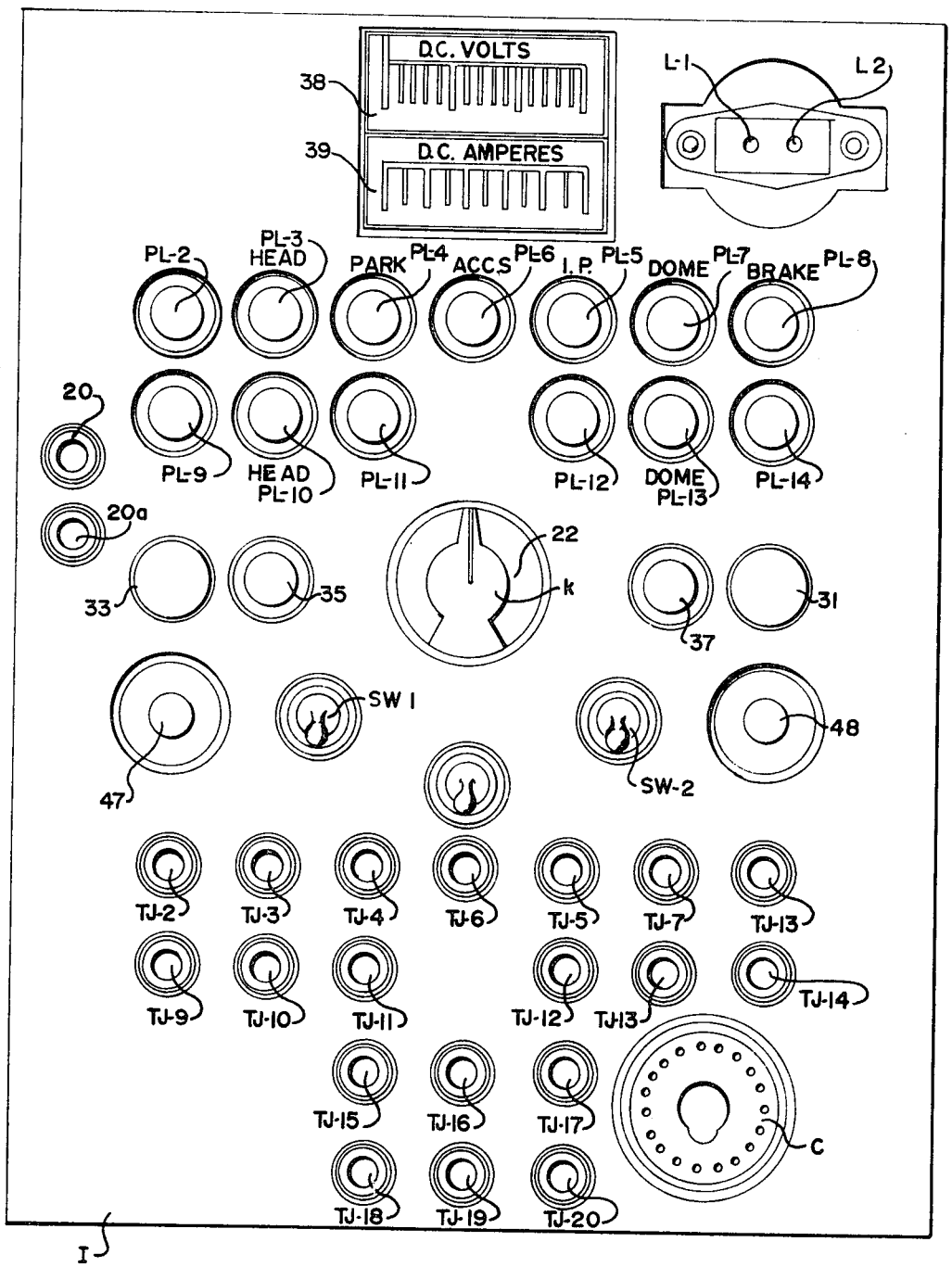
FIG. 2 is a top plan view of the indicating test unit shown in FIG. 1 with the overlay data sheet in position.

The indicating test unit T provides a plurality of independent circuits for checking continuity in electromechanical components such as the switch S. The test unit may be connected with a source of AC power by means of a plug 18 or to a source of DC battery potential through suitable connections such as a pair of test jacks 20 and 20a mounted in the top of the unit. The test unit T is provided with a plurality of electrically operable indicator means which may suitably comprise indicator lamps, generally designated L, and which are mounted on an insulated frame or housing, generally designated F. The indicator lamps L comprise individual lamp members PL-2 through PL-14 (FIG. 2) which are interconnected with female connectors or contacts generally designated C mounted in the top of the housing F to receive male connector pins formed in the connector 14. Depending on the particular switch utilized and the particular position to which it is moved, selected ones of the indicator lamps will be illuminated to indicate proper circuit operation as will be described hereinafter.

To interpret the illumination of the lamps L, a readout interpreter means generally designated I and comprising an overlay data sheet having graphic material printed thereon is removably mounted on the top of the housing F. A plurality of holes 22 (FIG. 3) are formed in the overlay data sheet I to permit the exposure of the panel lamps L, as will be described more fully hereinafter. As will also be more fully described hereinafter, each of the lamps L is connected with one of the female connector pins 19 of the connector 14 and hence any given panel lamp can be selected to indicate continuity for any given function of the electromechanical device to be tested. Therefore, when the programmed connector is fabricated, a specific relation between the position of the switch S and the illumination of a specific selected lamp can be established so that the switch position can be observed visually when the lamps are illuminated as a result of continuity checking. When this relationship is established, it graphically may be recorded on the overlay sheet I adjacent the holes 22 to assist the operator. For example, if the lamps PL-3 and PL-10 are illuminated when the switch 3 is in the position which would normally illuminate the vehicle's headlamps, then the space adjacent the holes 22 surrounding the lamps PL-3 and PL-10 would have indicia printed thereon indicating "Head." Similarly, if the lamps PL-7 and PL-13 are illuminated to indicate proper operation of the switch when it is in the position which normally illuminates the dome light, the overlay adjacent the holes fitting over the lamps PL-7 and PL-13 will be printed with the words "Dome." Other indicia are provided on the overlay I to provide an indication to the operator of the specific function which each lamp is intended to represent. Each panel lamp, when illuminated, thus indicates that a specific function of the switch S is continuous and, therefore, each lamp in essence represents that specific function of the switch being tested. Each such specific function is identified by indicia placed on the readout interpreter for that particular switch S.

If a switch other than that shown is to be tested, such as the turn signal switch for example, the overlay I is replaced by a different overlay which has indicia printed thereon peculiar to the turn signal switch. The programmed connector P and the disconnect 16 also are replaced with a different programmed connector and a different disconnect which are peculiar to the turn signal or other switch being tested. The readout interpreter I then provides the operator with an indication of which panel lamps represent which functions of the electromechanical device being tested, and further simplifies the use of the indicating test unit such that it requires no specific skill in operation. This results in minimum expenditures in the training period required for the operator and reduces the degree of skill required.

Figure 4:
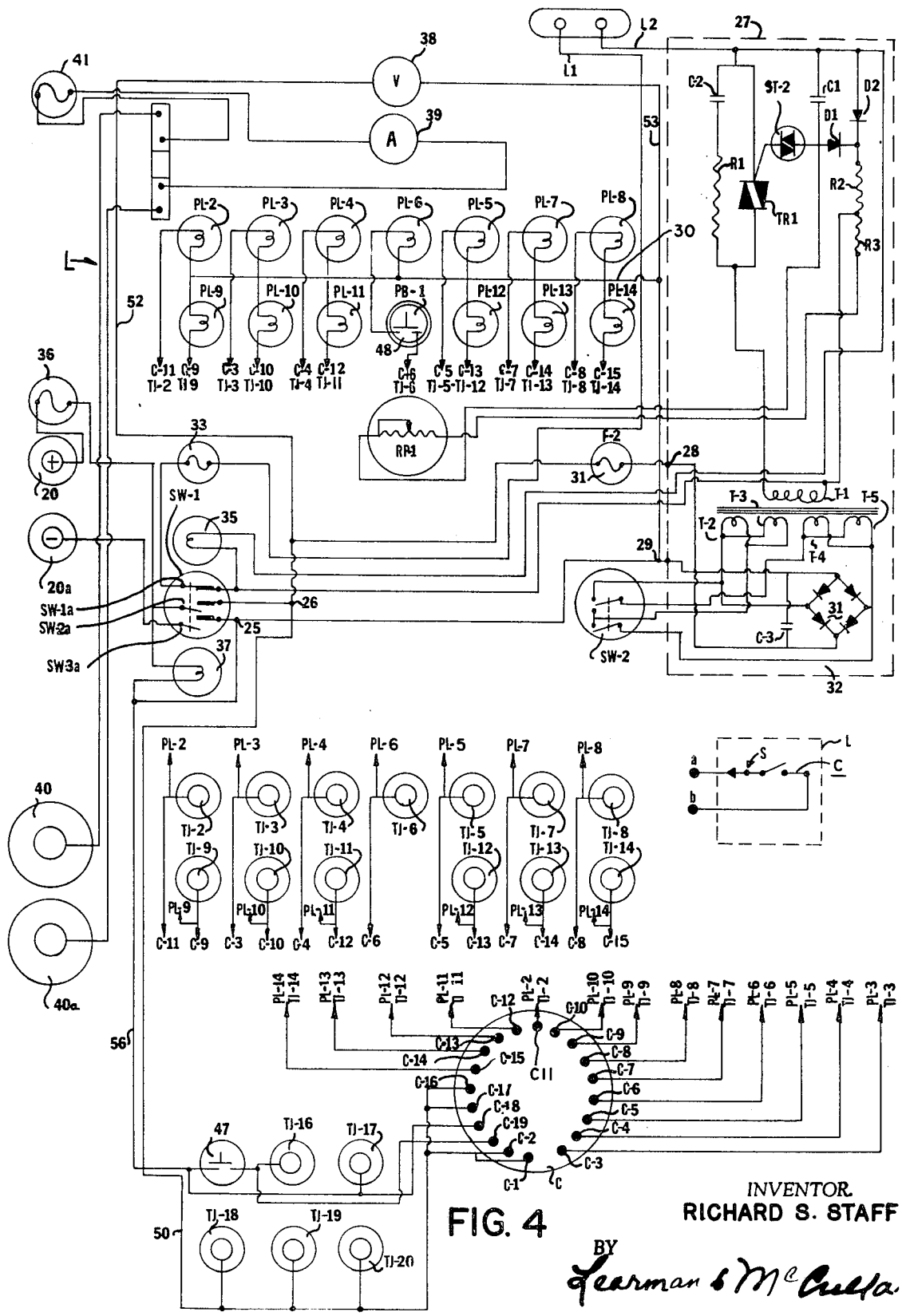
FIG. 4 is an electrical schematic diagram of the indicating test unit.

The indicating test unit circuit illustrated in FIG. 4 uses direct current only in that portion of its circuitry which is used for purposes of testing. This circuit is designated a direct current output power circuit, the terminals of which are indicated at 25 and 26. The direct current is supplied either directly from an external DC supply, such as the vehicle battery through jacks 20 and 20a, or is supplied internally by the power supply circuit shown in dotted lines at 27, the output terminals of which are shown at 28 and 29, as a result of rectifying an AC input which connected across lines L-1 and L-2 by means of a plug 18. The AC source connected across lines L-1 and L-2 can be a standard commercial voltage of 110–120 volts, 50 or 60 cycles, whereas the DC voltage source connected across input jacks 20 and 20a may comprise a standard 12-volt DC battery. In a manner to be described more fully hereinafter, a selector switch SW-1 is provided for selectively connecting the direct current output power circuit terminals 25 and 26 in circuit with either the direct current input circuit 20 and 20a or the alternating current supply input circuit 27.

Mounted in the insulated housing F of the indicating test unit T is a multipin connector C having a plurality of contacts therein in the form of female pin receptacles C-1 through C-19 adapted to receive the male pins of the connector 14. The direct current output power circuit 25 and 26 is directly connected to the contacts C-1, C-2, and C-16 through C-19. The remainder of the contacts C-3 through C-15 are connected to individual lamps L by suitable wires. The connections between these wires and the lamps is omitted for purposes of clarity, but the reference character adjacent the ends of each wire corresponds to the lamp to which it is connected.

The contacts C-1 through C-15 also are connected to one of the test jacks TJ-2 through TJ-14 the particular connections being similarly indicated by reference characters adjacent the ends of the wires connected with each of the contacts and test jacks. All of the lamps L are connected to a common return wire 30 which is connected to terminals 25 and 29. With each of the individual panel lamps connected to one of the contacts of the female connector C, one of the lamps will illuminate depending upon the particular switch being tested and the position in which it is located whereby illumination of the panel lamp will provide an indication of circuit continuity through the switch contacts when the lamp is being energized by the respective input it represents.

The AC power supply circuit 27 includes a transformer having a primary winding T-1, one side of which is connected to the line L-1 through a fuse 33 and closed contacts SW-1a of switch SW-1, the other side of the transformer being connected to the line L-2 through a bidirectional triode "Thyristor" which may be gate triggered from a blocking to a conducting state for either polarity of applied voltage across lines L-1 and L-2. A suitable device for this purpose is a "Triac," manufactured by the General Electric Company, which will perform most of the functions of two silicon controlled rectifiers connected in inverse parallel. A gating circuit is provided to render the "Thyristor" TR-1 conductive and includes a rheostat RP-1, a resistor R-3 and a capacitor C-1 connected in series across the lines L-1 and L-2, and a bidirectional triggering diode ST-2 connected between the junction of the capacitor C-1 and a rheostat RP-1 and the gate electrode of the "Thyristor" TR-1. The bidirectional triggering diode may be a "Diac" manufactured by General Electric Company. This device will provide a triggering signal to the "Thyristor" TR-1 on alternate half cycles of the input voltage depending upon the setting of the rheostat RP-1 and the values of the biasing circuit including diodes D-1, D-2 and a resistor $R_2$. Also included in the circuit is an attenuating circuit, including the capacitor C-2 and the resistor R-1 which will preclude the devices ST-2 and TR-1 from being inadvertently fired by a transient signal.

Coupled with the transformer primary winding T-1 is a plurality of secondary windings T-2 through T-5 for providing discrete direct current voltage outputs by means of a double pole, double throw switch SW-2 which, in one position, will connect all four windings in parallel and in the other position will connect windings T-2 and T-4 in series and the windings T-3 and T-5 in series across the input terminals of a bridge circuit 31. A filtering capacitor 32 is connected across the output of the bridge circuit 31, which is connected to output terminals 28 and 29 to remove the ripple component of the output voltage. Thus, the voltage at points 28 and 29 can be varied by turning knob $k$ (FIG. 2) to vary the resistance of the rheostat RP-1 which alters the conduction angle of the current flowing through the "Thyristor" TR-1 and the primary winding $T_1$. The amount of current flowing through the primary winding can be controlled to vary the output of the secondary transformer windings $T_2$ through $T_5$ which is rectified in the bridge circuit 31.

The voltage at points 28 and 29 can also be varied in discrete steps by means of the switch SW-2. By using the two variable voltage devices RP-1 and SW-2 in combination, an output of either 0–6 volts DC at 6 amperes maximum, or 0–12 volts DC at 6 amperes maximum may be provided, thereby providing flexibility in the operation and the types of testing which may be performed. A lamp 35 is also connected between the primary winding T-1 and line L-2 to provide a visual indication of the operation of the AC power supply circuit 17.

The DC output power circuit terminal 26 is connected directly to the terminal 28 through a fuse 31 whereas the DC output circuit terminal 25 is connected directly to the terminal 29. Thus, in order to disconnect the direct current output terminals 25 and 26 from the alternating current input across lines L-1 and L-2, the selector switch SW-1 must be moved from the position shown in FIG. 4 so that switch contacts SW-1a are opened to interrupt the circuit connection between contacts 25 and 29. Movement of the switch SW-1 in this manner results in the closure of contacts SW-2a and SW-3a so that the direct current input circuit terminal 20 is connected with direct current output circuit terminal 26 through fuse 36 and switch contacts SW-2a, whereas terminals 20a and 25 are connected through switch contacts SW-3a. An indicating lamp 37 is also connected between terminals 20 and 25 to provide a visual indication that the DC input circuit is connected across the direct current power circuit terminals 25 and 26. When the direct current input circuit is connected with the direct current power circuit terminals 25 and 26, therefore, the opening of contacts SW-1a interrupts the supply of alternating current to the transformer primary winding T-1, thereby precluding the use of the alternating current and direct current inputs simultaneously which could otherwise damage the equipment undergoing test.

A voltmeter 38 is connected across the direct current output power circuit terminals 25 and 26 and functions to monitor the input voltage supplied at terminals 20 and 20a, or the direct current voltage appearing at terminals 28 and 29. The voltmeter 38, in combination with the variable rheostat RP-1 can be utilized to establish a predetermined voltage across the output power circuit terminals 25 and 26 for the testing of relay type switch devices. By varying the voltage and observing the panel lights, the voltage values at which a relay opens and closes are monitored by the voltmeter in the DC output circuit as will be described more fully hereinafter. An ammeter 39 also is provided and connected to a pair of heavy duty test jacks 40 and 40a through a suitable fuse 41. The ammeter 39 can be utilized to measure the current delivery of an alternator or the current draw of a motor which, when compared with their respective specifications, discloses any problem existing in their respective circuits.

As shown in FIG. 6, an accessory generally designated 46 may be provided in the load circuit L in place of the switch S for evaluating circuit breakers, and includes a battery 41 and a variable load 42 connected across the circuit breaker 43 to be tested. The output terminals 44 and 45 of the accessory 46 are connected to test jacks 40 and 40a. As the load 42 is varied the flow of current though the breaker 43 is monitored by the meter 39. In this manner, the circuit breakers may be evaluated in terms of time required to open under the load conditions to which it is subjected by the battery 41 and the variable load 42.

Referring again to FIG. 4 and as will be described more fully hereinafter, connected with the direct current output power circuit terminal 25 is a momentary contact switch 47 which is connected in one branch of the DC output circuit and permits the operator to preset the output voltage across the terminals 25 and 26 before completing the circuit with certain of the connectors C and the terminals a and b of the device to be tested. After the desired voltage is set the switch 47 may be closed to apply the voltage across the terminals a and b.

A plurality of test jacks TJ-16 through TJ-20 also are provided which, in combination with the test jacks TJ-2 through TJ-14, may be utilized to bypass the connector C and directly connect the output power circuit terminals 25 and 26 to the terminals a and b of the test unit S by means of conventional male connectors which are inserted in the jacks. The test jacks TJ-2 through TJ-14 are each connected in circuit with one of the lamps PL-2 through lamp PL-14. A momentary contact switch 48 also is connected in series with the lamp PL-6 which will be illuminated when power is supplied from the output power circuit through the test jacks TJ-19 and TJ-6 which are connected to terminals a and b of the test unit S.

In operation, the indicating test unit is connected with a DC battery across terminals 20 and 20a or through a source of AC 110-volt power across lines L-1 and L-2. The switch S to be tested for continuity is disconnected from a vehicle electrical system and connected with the indicating test unit by either a programmed connector P or a pair of the test jack facilities TJ-2 through TJ-20 with conventional test jack cables. Assuming connection through the programmed connector P which is peculiar to the switch undergoing test, and that the switch SW-1 is in the position shown in FIG. 4, the alternating current input potential appearing across lines L-1 and L-2 will be connected across the terminals 25 and 26 of the output power circuit through power supply circuit 27. The voltage across lines L-1 and L-2 will be stepped down from 110 volts AC to 12 volts DC through transformer windings T-1 through T-5 and rectified in the bridge circuit 31. The output of the bridge circuit 31 will appear as a direct current voltage at terminals 28 and 29. Assuming that the switch S is a two position switch with a single set of contacts c which are to be tested, a programmed connector will be utilized which establishes electrical connection between contacts C-2 and C-11 and terminals a and b. Power will thus flow from terminal 28 through terminal 26, line 50, connector C-2, terminal b, switch contacts c, terminal a, connector C-11, test lamp PL-2, line 30, and back to terminal 29. An overlay I having indicia thereon peculiar to the switch undergoing test adjacent lamp PL-2 will provide an indication to the operator that this is the proper lamp to be illuminated when continuity through switch contacts c is established. Current will also flow from terminal 28 through conductor 52 through voltmeter 38 and conductor 53 to terminal 29, whereby the voltage appearing across terminals 25 and 26 can be determined.

Assuming now that the switch SW-1 is in a position opposite to that shown in FIG. 4 and that a different switch having similar contacts c is connected across terminals a and b, and that terminals a and b are connected with contacts C-10 and c-2 of the multipin connector, through a suitable programmed connector, current will then flow from input terminal 20 through fuse 36, through switch contacts SW-2a to terminal 26, line 50, connectors C-2, terminal a, contacts c, terminal b, contacts C-10, indicating lamp PL-10, return line 30, and terminal 29, terminal 25, switch contacts SW-3a, and terminal 20a. Current similarly will flow through the voltmeter 38 through lines 52 and 53. Current also will flow through lamp 37 to terminal 25 indicating that the direct current terminals 20 and 20a are connected in circuit.

If desired, the terminals a and b of the test unit S may be connected to the indicating unit through the test jacks. Assuming power at terminals 25 and 26 of the output power circuit, the terminals a and b may be connected by suitable connectors to test jacks TJ-18 and TJ-2 so that current flows from line 50 through the jack TJ-18, terminal b, terminal a, test jack TJ-2, lamp PL-2, return conductor 30, and terminal 25.

As shown in FIG. 5, a relay type switch device 55 having a relay coil 55a and switch contacts 55b present output terminals e, f, g and h. Terminals e, f, g and h may be connected with contacts C-16, C-17, C-19 and C-12, respectively by suitable wires, not shown, of a suitable programmed connector. Current is supplied from conductor 26 through line 50 to contacts C-16 and C-17. The current at connector C-17 flows through relay winding 55a, terminals C-19, the closed contacts of switch 47 and back to the terminal 25. When the current through the relay coil 55a is sufficiently high to cause switch contacts 55b to close, current will flow from connectors C-16 through switch contacts 55b, terminal h, contacts 55b, contact C-12, to indicator lamp PL-11, return line 30, and then back to terminal 25. By varying the voltage across points 25 and 26 by means of the rheostat RP-1, and observing the illumination of lamp PL-11, the voltages at which the relay 55 opens and closes may be determined by the voltmeter 38 in the direct current output circuit. The contacts of switch 47 are left in the open position until the voltage across the terminal 25 and 26 reaches the proper predetermined voltage as indicated by the voltmeter V. In this manner, the removable programmed connector P may be connected between the test unit T and switch S prior to the application of any power. The contacts of switch 47 which are then closed to complete the circuit to the unit being tested may be quickly opened if the voltage is improperly set. Various other combinations of the contacts of connector C and contacts of switch units can be connected with the lamps L in a manner which will be readily apparent.

The disclosed embodiments are representative of the presently preferred forms of the invention, but are intended to be illustrative rather than definitive thereof. The invention is defined in the claims.

I claim:

1. Apparatus for testing a selected one of a number of different kinds of electromechanical components each of which is adapted for removable connection to disconnect terminal means peculiar thereto and normally forming part of an electrical operating circuit, said apparatus comprising means forming an electrical test circuit independent of said operating circuit and having a plurality of indicating means; substitute disconnect terminal means for removable connection to said selected one of said components only when the latter is removed from the first mentioned disconnect terminal means and is electrically isolated from said operating circuit, said substitute disconnect terminal means corresponding to said first mentioned disconnect terminal means and being peculiar to said selected one of said components; a preprogrammed connector means selected for use with said substitute disconnect terminal means, connected to said substitute disconnect terminal means and removably connected to said test circuit for connecting the former in circuit with a selected number of said indicating means of said test circuit as determined by said preprogrammed connector; interpreter means having indicia thereon peculiar to said selected one of said components and removably located adjacent said selected number of said indicating means;

said test circuit comprising a direct current output power circuit connected to said plurality of indicator means, and adapted to be connected in circuit with said removable connector means to complete the circuit with the selected number of indicators; direct current supply input circuit means adapted for connecting to a direct current source for providing a direct current voltage to said direct current output power circuit; alternating current power supply input circuit means adapted for connection to a source of alternating current and having an output circuit means for providing a variable direct current output to said direct current output power circuit; and selector switch means for operatively connecting said output power circuit means in circuit with a selected one of said direct current input circuit or said alternating current power supply input circuit while simultaneously precluding connection with the other.

2. Apparatus as set forth in claim 1 further including an accessory unit for testing a circuit breaker and including a source of direct current and variable resistance means adapted for connection in circuit with openable and closable switch contacts of said circuit breaker, said test circuit including meter means connected to said accessory unit for monitoring the current flow through said circuit breaker when its contacts are closed.

3. Apparatus as set forth in claim 1 wherein said output power circuit includes momentary contact switch connected in circuit with one of said indicator means for permitting the output voltage to be adjusted prior to completing the circuit to said selected one of said components being tested.

* * * * *